United States Patent [19]

Lemon

[11] 3,744,348

[45] July 10, 1973

[54] PLANETARY TRANSMISSION MECHANISM AND HYDRAULIC CONTROL

[75] Inventor: Robert W. Lemon, Framington, Mich.

[73] Assignee: Borg-Warner Corporation, Chicago, Ill.

[22] Filed: June 1, 1971

[21] Appl. No.: 148,558

[52] U.S. Cl............. 74/869, 192/87.11, 192/109 F
[51] Int. Cl... B60k 21/00, F16d 25/10, F16d 11/00
[58] Field of Search.................... 74/869; 192/87.11, 192/109 F

[56] References Cited
UNITED STATES PATENTS

| | | | |
|---|---|---|---|
| 3,369,430 | 2/1968 | Haley............................. | 74/869 UX |
| 3,265,175 | 8/1966 | Croswhite.................... | 192/109 F X |
| 3,572,479 | 3/1971 | Kelley............................. | 74/869 X |
| 3,572,177 | 3/1971 | Ishihara......................... | 74/868 |
| 3,321,056 | 5/1967 | Winchell et al................. | 74/869 X |

Primary Examiner—Arthur T. McKeon
Attorney—Donald W. Banner

[57] ABSTRACT

An automatic transmission mechanism including a planetary gear train and a hydraulic control mechanism adapted to control engagement of friction engaging devices for establishing various drive ratios through the gear train. The planetary transmission including first and second clutch mechanisms, a one-way brake mechanism to establish low gear ratio and a one-way brake mechanism to establish second gear ratio, the engagement of both said clutch mechanisms providing a 1:1 direct drive ratio. A friction brake mechanism is provided in parallel with each of said one-way brake mechanisms to provide first and second two-way drive ratios through the transmission mechanism. One of the clutch mechanisms includes a double hydraulic servomotor arrangement whereby a minimum engaging force can be utilized for one of the clutches, for direct drive to provide for a smooth shift to direct drive and whereby when reverse ratio is established utilizing the same clutch mechanism both hydraulic servomotors for the clutch can be actuated to provide the high engagement force required for reverse drive. A double hydraulic servomotor also is provided for the friction brake mechanism for low drive ratio whereby a single one of said servomotors can be utilized for low drive ratio and both servomotors can be utilized to engage the same brake mechanism for reverse ratio when a higher engaging force is required. The hydraulic control mechanism including engine torque and vehicle speed responsive accumulator devices for each of the clutch mechanisms and for a second speed brake mechanism. Sequencing valves being included in the control mechanism to insure that when reverse drive ratio is being established only one of the servomotors in the clutch mechanism and the low gear brake mechanism is actuated initially, the second servomotor being actuated by said sequence valves thereafter to enable a smooth engagement of reverse drive ratio even though an increased line pressure is used for reverse drive ratio.

10 Claims, 6 Drawing Figures

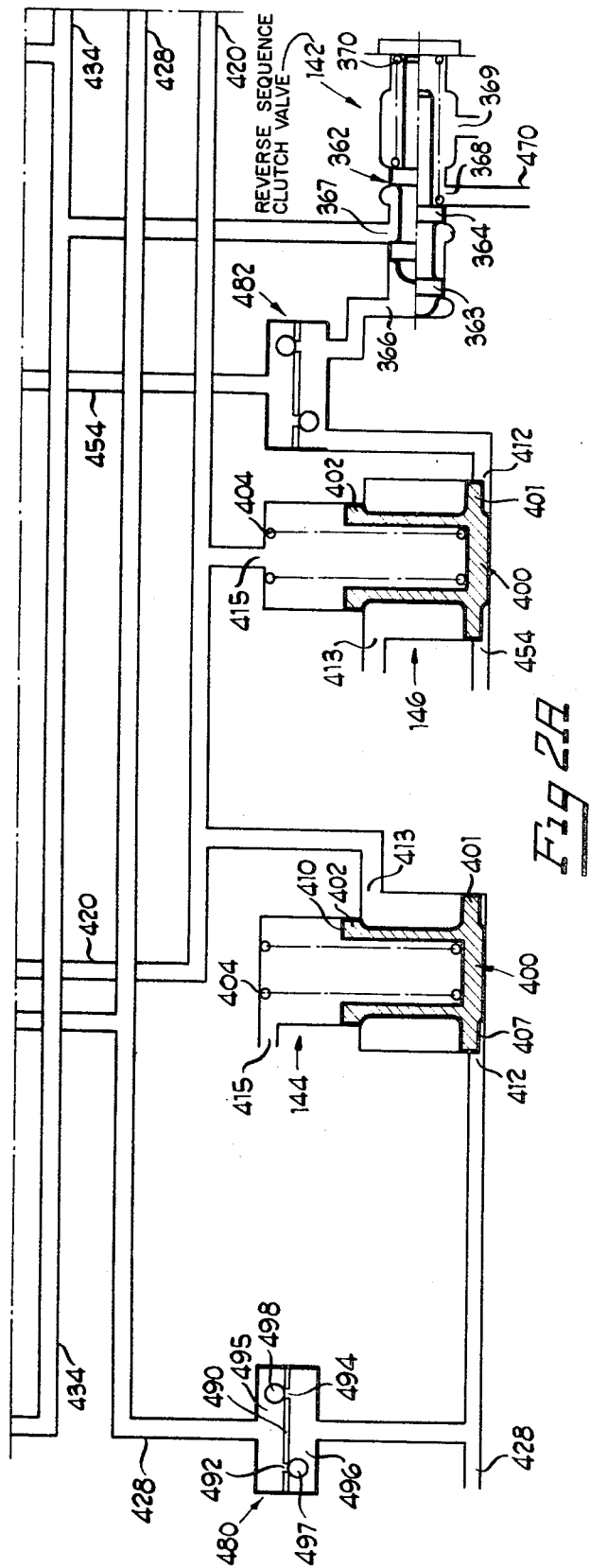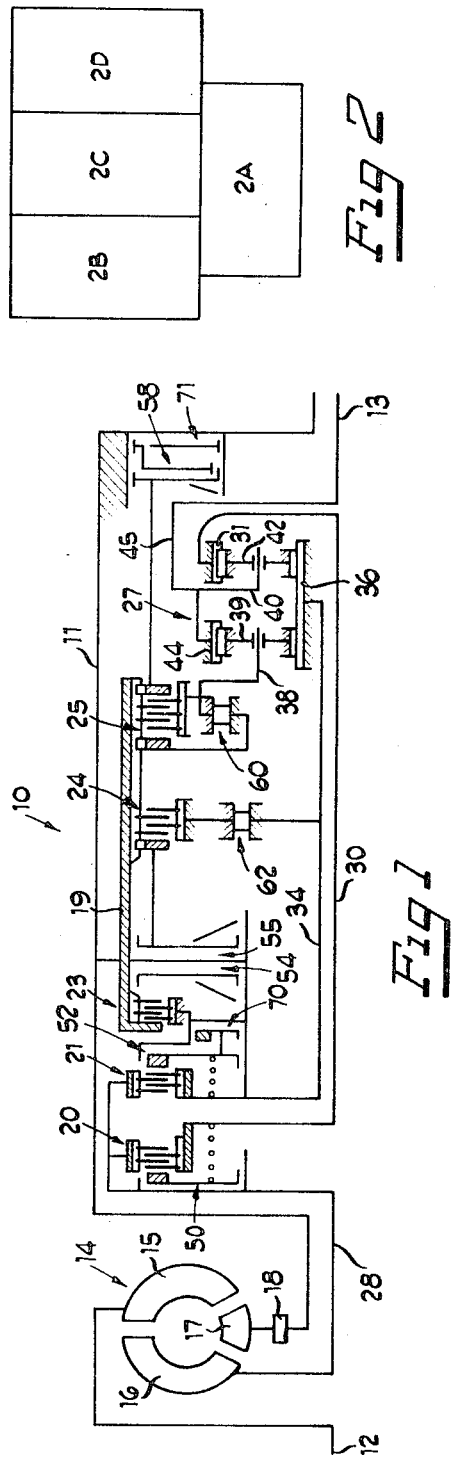
INVENTOR
ROBERT W. LEMON
BY Robert L. Zieg
ATTORNEY

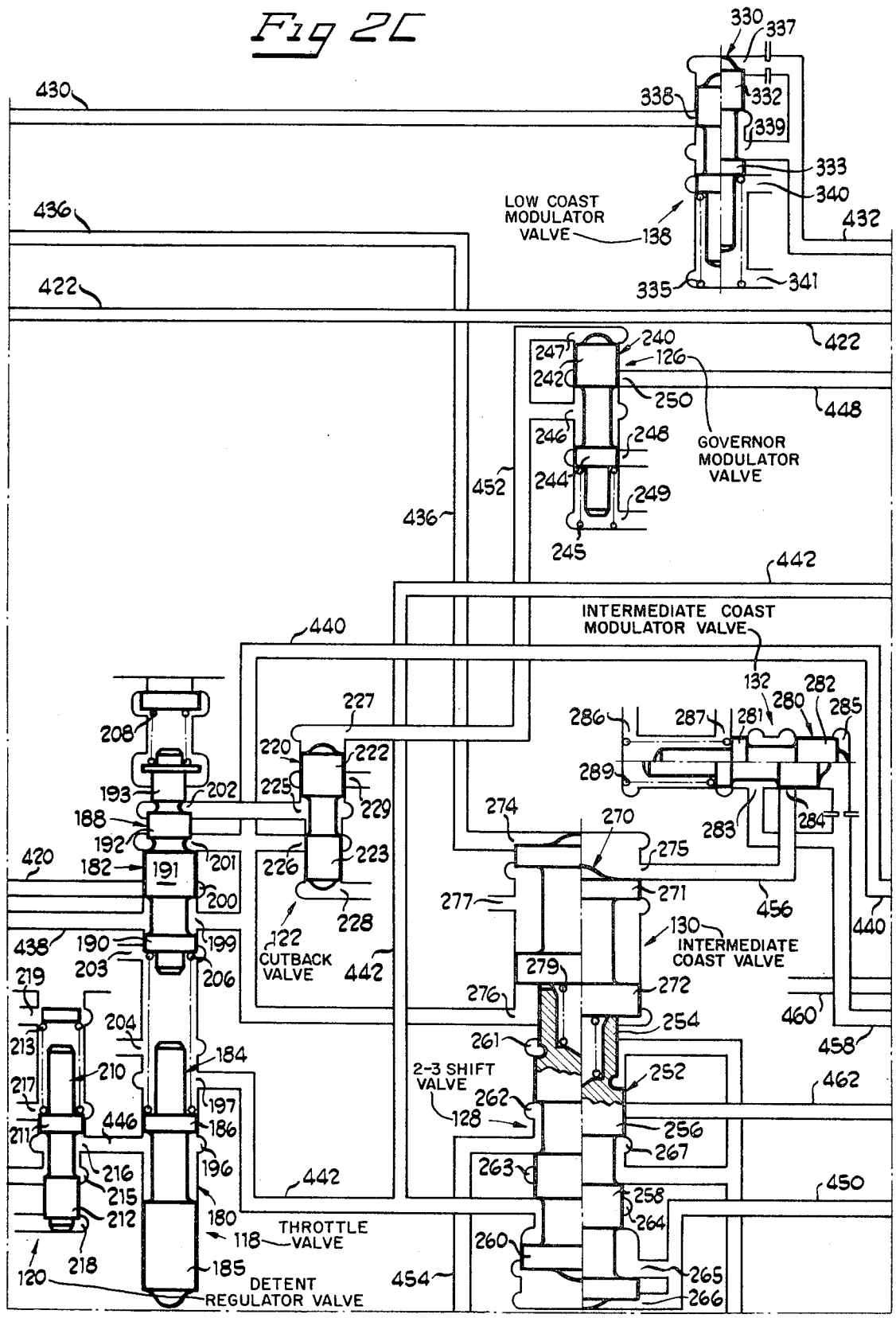

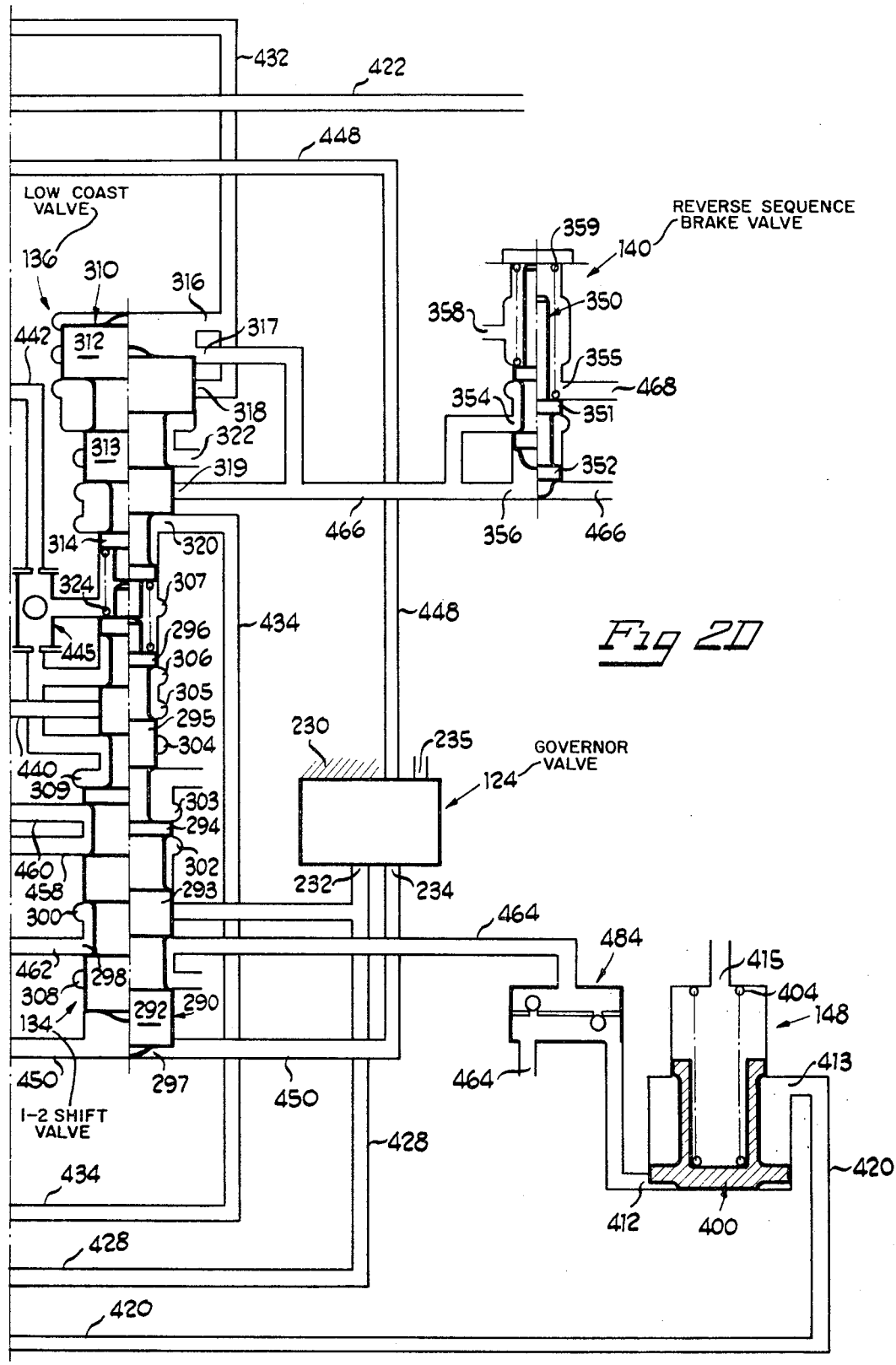

PLANETARY TRANSMISSION MECHANISM AND HYDRAULIC CONTROL

SUMMARY OF THE INVENTION

The hydraulic control mechanism of the present invention is advantageous in that smooth shifting is accomplished by having an accumulator device for each of two clutch mechanisms utilized to establish drive ratios and for a second speed brake mechanism. The control mechanism develops a pressure signal varying with both engine torque and vehicle speed, which signal is applied to each of the accumulator mechanisms whereby the rate of pressure build-up in the servomotor for each of the clutch mechanisms and the second speed brake mechanism will vary with the vehicle speed and engine torque signal to automatically match the torque capacity of the friction devices during engagement thereof with the torque requirements of the vehicle at the time a particular ratio is being established. The improved hydraulic control mechanism includes sequencing valves automatically to insure that when reverse drive ratio is being established only one of the servomotors in the clutch mechanism and the low gear brake mechanism is actuated initially, the second servomotor being actuated by said sequence valves thereafter whereby a smooth engagement of reverse drive ratio is provided even though an increased line pressure is used for reverse drive ratio.

BRIEF DESCRIPTION OF THE DRAWINGS

FIG. 1 is a longitudinal schematic view of a transmission mechanism with which the improved controls of the present invention are intended to be used;

FIG. 2 is a reference layout diagram for combining FIGS. 2A, 2B, 2C and 2D; and

FIGS. 2A, 2B, 2C and 2D present a complete illustration of the control system of the present invention.

PLANETARY GEAR MECHANISM

Figure 2B:
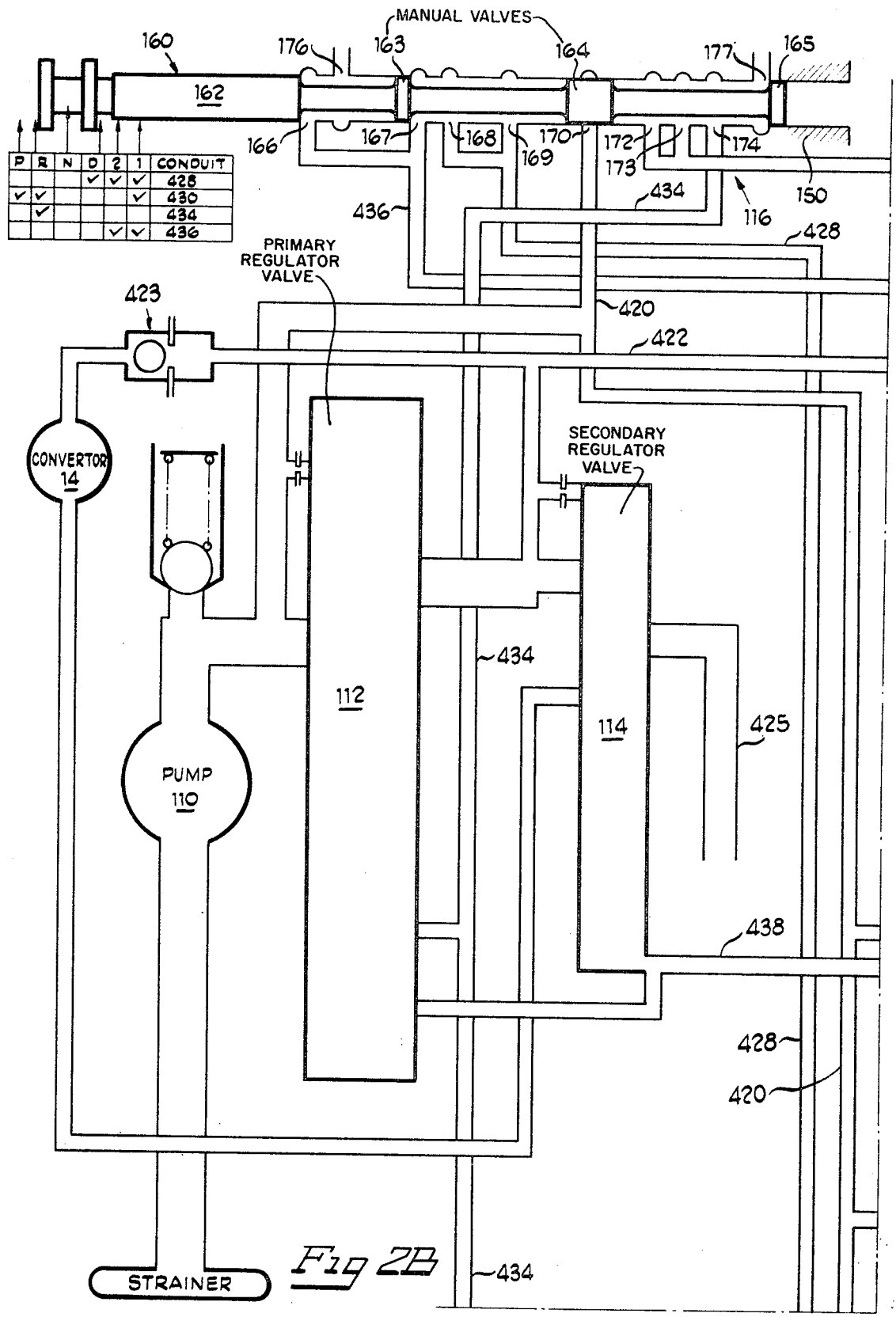

Referring to FIG. 1, a transmission mechanism 10 is schematically illustrated. This transmission includes a transmission casing 11, an input shaft 12, an output shaft 13 and a torque converter mechanism 14. The torque converter mechanism 14 includes an impeller member 15, a turbine member 16, and a stator member 17 connected with a one-way brake mechanism 18. Rotatably fixed in the case 11 is a stationary sleeve 19 which has incorporated therein several of the friction engaging mechanisms for the transmission mechanism. Also provided in the transmission case 11 is a pair of clutches 20 and 21, friction brake mechanisms 23, 24 and 25 and a planetary gear set 27. An intermediate shaft 28 connects turbine 16 with clutches 20 and 21. An intermediate shaft 30 interconnects clutch 20 with an annulus gear 31 in the gear set, an intermediate shaft 34 interconnects clutch 21 with a double sun gear arrangement 36 for the gear set 27. The planetary gear set 27 further includes a planetary gear carrier 38 having planetary pinions 39 journalled thereon and a planetary carrier 40 having planetary pinions 42 journalled thereon. The planetary pinions 42 mesh with the annulus gear 31 and the sun gear 36. There is further provided an annulus gear 44 meshing with planetary pinions 39. A member 45 connects annulus gear 31 and carrier 40 with output shaft 13.

A hydraulic servomotor 50 is provided for clutch 20. Hydraulic servomotors 52 and 70 are provided for clutch 21. A hydraulic servomotor 54 is provided for friction brake 23 and a hydraulic servomotor 55 is provided for friction brake 24. Hydraulic servomotors 58 and 71 are provided at the rear of the transmission case 11 for friction brake 25. A one-way brake 60 is provided for the planetary carrier 38, a one-way brake 62 is provided between friction brake 24 and intermediate shaft 34.

Operation of the transmission mechanism as described above and relating to the schematic showing in FIG. 1 is as follows: with clutches 20 and 21 disengaged a neutral condition is established.

Low or first ratio is established by application of clutch 20 connecting shaft 30 with input shaft 12 thereby driving annulus gear 31 in the forward direction. The planetary carrier 40 is connected to output shaft 13 thereby providing a forward drive of the output shaft 13 at a reduced speed, one-way brake 60 holding planetary carrier 38 to provide a reaction element for the planetary gear set. A manual first speed drive ratio similar to the one-way drive just described may be provided by engagement of the low coast brake 25 by means of hydraulic servomotor 58 holding planetary carrier 38 against rotation in either direction thereby establishing a two-way drive through the planetary gear set.

Second drive ratio is provided by clutch 20 remaining engaged and engagement of friction brake 24 by hydraulic servomotor 55 thus holding the sun gears 36 stationary. Under these conditions a higher speed forward drive is provided by the planetary carrier 40 driving input shaft 12 at a reduced speed with one-way brake 62 being made effective to hold sun gears 36 stationary establishing a one-way drive connection for second speed. Optionally an intermediate or second coast brake 23 may be applied to hold shaft 34 against rotation in either direction to provide a two-way second speed drive ratio.

Third speed drive ratio is provided by clutch 20 remaining engaged and clutch 21 being engaged by hydraulic servomotor 70 thereby locking shafts 34 and 30 together, locking up the planetary gear set and providing a 1:1 or direct drive ratio of the output shaft 13.

Reverse drive ratio is established by engagement of clutch 21 and engagement of friction brake 25 of the sun gear 36 thus being driven in a forward direction planetary carrier 38 being held stationary and thus driving annulus gear 44 and thereby output shaft 13 in the reverse direction.

Servomotor 52 for clutch 21 has the adjoining smaller servomotor 70 such that the clutch can be applied using only servomotor 70 alone or by both servomotors 52 and 70, as will be later described. Servomotor 58 has adjoining thereto second servomotor 71 whereby the brake 25 may be engaged by either servomotor 58 alone or by both servomotors 58 and 71, as will be later described.

HYDRAULIC CONTROL MECHANISM

The control system in general includes a source of pressure or pump 110, a primary regulator valve 112, a secondary regulator valve 114, a manual valve 116, a throttle valve 118, a detent regulator valve 120, a cutback valve 122, a governor valve 124, a governor modulator valve 126, a 2:3 shift valve 128, an intermediate coast valve 130, an intermediate coast modulator valve 132, a 1:2 shift valve 134, a low coast valve 136, a low coast modulator valve 138, a reverse sequence brake valve 140, a reverse sequence clutch valve 142, a first clutch accumulator 144, a second clutch accumulator 146, and an intermediate brake accumulator 148. To simplify the description and add clarity thereto the following table illustrates alphabetical symbols used to reference the various valves in the transmission in the following description:

PRV 112 = primary regulator valve
SRV 114 = secondary regulator valve
MV 116 = manual valve
TV 118 = throttle valve
DRV 120 = detent regulator valve
CV 122 = cutback valve
GV 124 = governor valve
GMV 126 = governor modulator valve
2:3 SV 128 = 2:3 shift valve
ICV 130 = intermediate coast valve
ICMV 132 = intermediate coast modulator valve
1:2 SV 134 = 1:2 shift valve
LCV 136 = low coast valve
LCMV 138 = low coast modulator valve
RSBV 140 = reverse sequence brake valve
RSCV 142 = reverse sequence clutch valve PRV 112 and SRV 114 are shown in block form only since they are very similar to known pressure regulating systems, as for example, illustrated in FIG. 4A of U. S. Pat. No. 3,117,464 and only the function of these valves will be described.

MV 116 by means of which the transmission is conditioned for various drive functions is mounted in a valve body 150. To simplify the description it should be recognized that each of the various valves of the transmission are mounted in bores in a common valve body 150, and the bores and sections of the valve body 150 will not be further described in connection with the detailed description of each valve.

MV 116 includes a valve stem 160 having lands 162, 163, 164 and 165 thereon. Intersecting the bore for the MV 116 are pressure ports 166, 167, 168, 169, 170, 172, 173 and 174. Also intersecting the bore are exhaust ports 176 and 177.

TV 118 comprises a detent valve section 180 and a throttle valve section 182. Detent valve section 180 includes a valve stem 184 having lands 185 and 186 thereon. The throttle valve section includes a valve stem 188 having lands 190, 191, 192 and 193 thereon. The bore for the throttle valve includes pressure ports 196, 197, 199, 200, 201 and 202. The bore further includes exhaust ports 203 and 204. A spring 206 is mounted in the bore in engagement with valve stem 184, 188 urging same apart. In addition, a spring 208 is mounted between the end of the bore and the valve stem 188.

DRV 120 comprises a valve stem mounted in a bore in a valve body 150, the stem 210 having lands 211, 212 thereon. A spring 213 is provided in the bore in engagement with land 211. Land 211 is larger than land 212 providing a differential area there-between. The bore for valve 210 includes pressure ports 215 and 216. The bore further includes exhaust ports 217, 218 and 219.

CV 122 comprises a valve stem 220 having lands 222, 223 thereon. Land 222 is larger than land 223 providing a differential area there-between. The bore for CV 122 includes pressure ports 225, 226, 227. The bore further includes exhaust ports 228, 229.

GV 124 is mounted in a separate body 230 which is connected to be rotated with the output shaft 13 of the transmission. The valve has pressure ports 232 and 234 and an exhaust port 235. The GV 124 is shown in block form only since it may be of a known type, as for example as shown in FIG. 4 of U. S. Pat. No. 3,117,464 and a detailed description is not deemed necessary.

GMV 126 includes a valve stem 240 mounted in a bore and has lands 242 and 244 thereon. A spring 245 is mounted in the bore in enagement with land 244. Pressure ports 246, 247 and 250 are provided in the bore for stem 240. The bore further includes exhaust ports 248 and 249.

2:3 SV 128 comprises a valve stem 252 mounted in a bore in the body 150 and includes lands 254, 256, 258 and 260. Land 256 is larger than land 254 providing a differential area there-between. Land 260 is larger than land 258 providing a differential area there-between. Provided in the bore for stem 252 are pressure ports 261, 262, 263, 264, 265, 266 and 267. Valve stem 252 is shown in a split form as are the valve stems of ICV 130, ICMV 132, 1:2 SV 134, LCV 136, LCMV 138, RSBV 140 and RSCV 142 to illustrate the different positions of the stems of various valves with clarity.

ICV 130 includes a valve stem 270 having lands 271 and 272 thereon. The bore for the valve stem 270 includes pressure ports 274, 275 and 276 and, in addition, an exhaust port 277. A spring 279 is mounted in a counterbore in stem 252 and engages stems 252 and 270 to urge same apart.

ICMV 132 comprises a valve stem 280 having lands 281 and 282 thereon. The bore for the valve stem 280 includes pressure ports 283, 284 and 285 and also includes exhaust ports 286 and 287 and a spring 289 mounted in the bore in engagement with land 281 urging the valve stem to the right as illustrated in FIG. 2C.

1:2 SV 134 includes a valve stem 290 having lands 292, 293, 294, 295 and 296 thereon. Land 294 is larger than land 295 providing a differential area there-between. The bore for the stem 290 includes pressure ports 297, 298, 300, 302, 303, 304, 305, 306 and 307. The bore further includes exhaust ports 308 and 309.

LCV 136 includes a valve stem 310 having lands 312, 313, 314 thereon. The bore for stem 310 includes pressure ports 316, 317, 318, 319 and 320. The bore further includes an exhaust port 322. A spring 324 is mounted in the bore in engagement with land 314 and with land 296 of stem 290 to urge stems 290 and 310 apart. Land 312 is larger than land 313 providing a differential area there-between. Land 313 is larger than land 314 providing a differential area therebetween.

The LCMV 138 comprises a valve stem 330 having lands 332, 333 thereon. A spring 335 is mounted in the bore for the valve stem 330 in engagement with land 333 and urges the stem upwardly, as viewed in FIG. 2C. The bore for stem 330 includes pressure ports 337, 338, 339 and also includes exhaust ports 340 and 341.

RSBV 140 includes a valve stem 350 having lands 351 and 353 thereon. The bore for the valve stem 350 has pressure ports 354, 355 and 356. The bore further includes an exhaust port 358, a spring 359 mounted in the bore in engagement with land 351.

RSCV 142 includes a valve stem 362 having lands 363 and 364 thereon. The bore for the valve stem 362 further has pressure ports 366, 367, 368 and includes an exhaust port 369. A spring 370 is provided in the bore in engagement with land 364 urging the valve stem 362 to the left, as viewed in FIG. 2A.

Three accumulators 144, 146 and 148 are provided for the transmission mechanism which are adapted to work in conjunction with the servomotors for their respective friction devices to control the rate of pressure build-up in the servomotors for the friction devices. Since the structure of the three accumulators is identical except for certain differences to be discussed, like numbers will be utilized for each of the accumulators to indicate like elements. For example, accumulator 144 includes a piston 400 having lands 401 and 402 thereon. Land 402 is smaller than land 401 thereby creating a differential area between the lands. A spring 404 is mounted in the accumulator in engagement with counterbore 405 in the piston and urges the accumulator piston downwardly as viewed in FIG. 2A. The piston thus includes a pressure-responsive surface which can be defined as the differential area between lands 401, 402 on the upper side thereof and includes a pressure responsive surface 407 on the lower side thereof as viewed in FIG. 2A. An additional pressure responsive surface 410 on the upper side of the piston is utilized, as will be explained. Each of the accumulators 144, 146, 148 further includes a port 412 which can admit fluid to pressure responsive surface 407, a port 413 which can admit fluid to the differential area between lands 401 and 402 and a port 415 which can admit pressure to the pressure responsive surface 410. As will be explained in more detail, in accumulators 144 and 148 ports 413 and 412 are pressure ports and port 415 is an exhaust port. In accumulator 146 the port 413 is an exhaust port and port 415 is a pressure port.

Hydraulic conduits are provided for interconnection of the valves of the hydraulic control system. A conduit 420 which is the main or line pressure conduit is connected to the outlet of pump 110 to port 170 of MV 116, port 200 of TV 118, port 215 of DRV 120, port 413 of accumulator 144, port 415 of accumulator 146, and port 413 of accumulator 148. A conduit 422 connects PRV 112 and SRV 114 to the torque converter 14 and includes a check valve 423 in the conduit. Conduit 422 also acts as the lubrication supply for the transmission. Conduit 425 connects SRV 114 to the cooler, which is not illustrated in the drawings. A conduit 428 is connected to ports 168 and 169 of MV 116, to the servomotor 50 for the first clutch 20, to port 232 of GV 124 and port 300 of 1:2 SV 134. A conduit 430 connects port 172 and 173 of MV 116 to port 338 of LCMV 138. A conduit 432 connects ports 339 and 337 of LCMV 138 to ports 316, 318 of LCV 136. A conduit 434 connects port 174 of MV 116, PRV 112, port 367 of RSCV 142, port 261 of 2:3 SV 128, port 320 of LCV 136, and to port 263 of 2:3 SV 128. A conduit 436 connects port 166 and 167 of MV 116 with port 274 of LCV 130. A conduit 438 connects port 199 of TV 118 with PRV 112 and SRV 114. Conduit 440 connects port 199 and 201 of TV 118 with port 226 of CV 122, port 276 of ICSV 130 and port 305 of 1:2 SV 134. Conduit 443 connects port 202 of TV 118 and port 225 of CV 122. A conduit 442 connects port 197 of TV 118 with port 264 of 2:3 SV 128 and ports 307, 306 and 304 of 1:2 SV 134. Provided in conduit 442 is a two-way ball check valve 445, the purpose of same to be later described.

A conduit 446 interconnects port 196 of TV 118 with port 216 of DRV 120. A conduit 448 connects port 234 of GV 124 with port 250 of GMV 126. Conduit 450 connects port 234 of GV 124 with port 297 of 1:2 SV 134 and ports 265 and 266 of 2:3 SV 128. Conduit 452 connects port 246 and 247 of GMV 126 to port 227 of CV 122. A conduit 454 connects port 267 of 2:3 SV 128 with port 366 of RSCV 142, port 412 of accumulator 146 and servomotor 70 for second clutch 21. A conduit 456 connects ports 275 of ICSV 130 and port 284 of ICMV 132. A conduit 458 connects ports 285 and 283 of ICMV 132 with ports 302 of 1:2 SV 134. A conduit 460 connects port 303 of 1:2 SV 134 with servomotor 54 for the intermediate coast brake 23. A conduit 462 connects the port 262 of 2:3 SV 128 with port 298 of 1:2 SV 134. A conduit 464 connects port 298 of 1:2 SV 134 with port 412 of accumulator 148 and with servomotor 55 for intermediate brake 24. A conduit 466 connects ports 317 and 319 of LCV 136 with ports 354, 356 of RSPV 140. A conduit 468 connects port 355 of RSPV 140 with servomotor 71 for brake 25. A conduit 470 connects port 368 of RSCV 142 to servomotor 52.

Orifice ball valves 480, 482 and 484 are provided in conduits 428, 454 and 464 respectively. Only orifice ball valve 480 will be described in detail since the other valves are identical in construction. Valve 480 includes a dividing plate 490 having orifices 492 and 494 therein. A chamber 495 is provided on one side of the plate 490 and a chamber 496 is provided on the other side of the plate. A ball 497 is engageable with orifice 492 and a ball 498 is engageable with orifice 494. The orifice ball valve acts as a two-way check valve in that fluid flowing through the valve toward the servomotor 50, for example in conduit 428, will flow through orifice 492 moving ball 497 from engagement with orifice 492, ball 498 being in engagement with orifice 494 preventing flow through orifice 494. Fluid being exhausted from servomotor 50 will flow through orifice 494, ball 497 at this time being engaged with orifice 492 preventing flow therethrough. Thus the orifice ball valve 480 provides a means whereby a separate orifice may be provided for both the supply and exhaust of fluid from the servomotor. Thus a proper size orifice may be provided for each of the fill and exhaust functions. Further, the orifices can be easily varied by changing the plate 490 within the orifice ball valve 480. Likewise, orifice ball valves 482 and 484 are advantageous in that a separate and proper orifice size for both the filling and exhausting of their respective servomotors is provided.

OPERATION OF HYDRAULIC CONTROL MECHANISM

The operation of the hydraulic control system of the present invention will now be described. Conduit 420 is the main line pressure conduit and is the main pressure supply to the various valves of the hydraulic control system. The main line pressure in conduit 420 is regulated by the PRV 112 to vary with a signal responsive to vehicle speed and engine torque. Main line pressure will gradually decrease as the vehicle speed increases and will increase with increased engine torque as reflected by the position of the throttle pedal of the vehicle, as will be explained.

The throttle valve section 182 of TV 118 receives the main line pressure at port 200. The valve position will vary in accordance with throttle position and provide various size openings between port 200 and port 199. Port 199 will admit this pressure to the PRV 112 and SRV 114 through conduit 438, the function of the SRV 114 being to regulate the fluid pressure in the hydraulic torque converter. Conduit 438 is the vehicle speed and engine torque signal conduit for effecting the regulator valve to obtain the variable line pressure in conduit 420.

The governor valve 124 receives pressure at port 232 from conduit 428 when MV 116 is in its D2 or "*l*" position, as will be later described. The governor valve 124 is not shown in detail but acts in a known manner to admit pressure at port 234 to conduits 450 and 448. This pressure increases with increasing speed of the driven shaft of the vehicle, the governor being rotated with the driven shaft 13 and the weights in same (not illustrated) responsive to centrifugal force and thereby the speed of the shaft to provide varying pressures in conduits 448 and 450.

The governor pressure in conduit 448 is admitted at port 250 of GMV 126. Spring 245 urges stem 240 upwardly as viewed in FIG. 2C admitting pressure from port 250 to port 246 and into conduit 452. This pressure is also admitted at 247 to the top of land 242. Until a predetermined governor pressure exists GMV 126 will remain in its upper position admitting governor pressure to conduit 452. When the predetermined pressure is reached, for example 15 psi, the GMV will move to block port 250. Thus the governor pressure in conduit 452 is limited to a predetermined maximum by GMV 126. The governor pressure in conduit 452 is imposed on land 222 of valve stem 220 of CV 122.

Pressure, as explained above, will be admitted to port 199 of TV 118 when the throttle of the vehicle is depressed, moving land 191 so as to partially open port 200 to admit line pressure from port 200 to port 199. This pressure is admitted to port 226 of CV 122 and flows between lands 223 and 222 of CV 122 into conduit 443. Throttle pressure acting on the differential area between lands 222 and 223 tends to move valve stem up to admit throttle pressure to conduit 443. The pressure in 443 will thus vary with the pressure admitted at port 226 from TV 118 and with the amount of governor pressure in conduit 452 imposed on land 222. The pressure in line 443 will thus be responsive to governor pressure and thereby vehicle speed. However, when the GMV has acted to limit the amount of governor pressure to the predetermined maximum, the pressure in 443 will not be sensitive to further increases in vehicle speed. Further, when the throttle pressure is less than the governor pressure in conduit 452 by a fixed ratio dependent on the area of lands 222 and 223, CV 122 will be in its lower position admitting full throttle pressure to conduit 443.

Pressure in conduit 443 is admitted at port 202 of throttle valve section 182 acting on the differential area between lands 192 and 193 to urge the valve stem 188 downwardly tending to reduce the pressure in conduit 438 and 440. As vehicle speed increases and the governor pressure in conduits 448 and 452 increases (assuming the predetermined maximum governor pressure that will activate GMV 126 has not been reached), the pressure in conduit 442 will increase providing an increased force on valve stem 188 tending to move same downwardly, thus reducing the pressure in conduit 438. As the pressure in conduit 438 is reduced the main line pressure in conduit 420, as regulated by the PRV 112, will also be reduced. If the throttle valve is moved indicating increased engine torque, the valve stem 188 will be moved upwardly to increase the pressure signal in conduit 438 thereby increasing the main line pressure. The relationship thus established by the governor pressure and the throttle position as affecting the CV 122 and the TV 118 will be such as to produce a signal in conduit 438 which increases with increased throttle movement and decreases with increased vehicle speed in accordance with the governor pressure. The pressure signal in conduit 438 thus produces the desired line pressure influence such that at higher vehicle speeds and reduced engine torque line pressure is reduced, and at lower vehicle speeds and increased engine torques line pressure is increased. The main line pressure in conduit 420 varies gradually in accordance with the gradual variance of the signal in conduit 438.

The valve stem 252 for 2:3 SV 128 has an upshifted or "3" position illustrated in FIG. 2C which is the higher position of the stem and a downshifted or "2" position as illustrated by the lower position of the stem. Likewise, 1:2 SV 134 has an upshifted or "2" position as illustrated by the upper position of the valve stem 290 and a downshifted or "1" position illustrated as the lower position of the stem. Governor pressure in conduit 450 acts on land 292 of 1:2 SV 134 tending to move stem 290 to its "2" position and is also admitted to act on land 260 of 2:3 SV 128 tending to move the valve stem 252 to its upshifted or "3" position. Thus as vehicle speed increases the shift valves are urged toward their higher ratio positions. Throttle position responsive pressure in conduit 440 is admitted at port 305 to port 306, check valve 445, and port 307 to act on land 296 of valve stem 290 of 1:2 SV 134. Throttle pressure in conduit 440 is also admitted at port 276 to act on 254 of valve stem 252 of 2:3 SV 128. The throttle pressure in each case tends to move the shift valve stems to their lower ratio or downshifted positions. The operation of the shift valves will be described in greater detail in the following description.

MV 116 is moved by the operator of the vehicle to its various functional positions. These positions are illustrated in FIG. 2B in a table form which illustrates a park of "P" position, reverse or "R" position, neutral or "N" position, a drive or "D" position and "2" and "1" positions. Main line pressure in conduit 420 is connected to various conduits of the control system in its various positions as illustrated in the table, the "*xs*" indicating that the particular conduit is receiving line pressure from conduit 420.

MV 116 is illustrated in its neutral or "N" position in which land 164 blocks port 170 of line pressure conduit 420, thus no pressure is admitted to any other of the conduits at the manual valve 116. At this time, none of the servomotors of the transmission is receiving fluid pressure and thus the transmission is in its neutral position. When MV 116 is moved to its "D" or drive position, ports 168, 169 and 170 are connected and line pressure is admitted into conduit 428. Pressure in conduit 428 will flow through orifice 492 of valve 480 and thus to servomotor 50 for first clutch 20. This pressure is also admitted to port 232 of the governor valve thus conditioning the governor valve 124 to produce its speed responsive signal in conduit 448. As described above, with clutch 20 applied, one-way brake 60 will be engaged to hold carrier 38 and the transmission is conditioned for its low speed ratio, this ratio being a one-way driving ratio at this time.

Actuation of the servomotor 50 and engagement of clutch 20 is controlled by accumulator 144. Accumulator 144 has line pressure admitted at port 413 acting on the differential area between lands 402 and 401. Since the line pressure is vehicle speed and engine torque sensitive, accumulator 144 is thus sensitive to engine torque and vehicle speed. The line pressure admitted to conduit 428 to engage clutch 20 will act on the pressure responsive surface 407 tending to move piston 400 upwardly to its upper or full stroked position. The pressure at which the piston 400 will begin moving up depends on the amount of pressure in conduits 428 and on the vehicle speed and torque sensitive line pressure and the preload of spring 404. Thus, if the main line pressure is high indicating high engine torque, the piston 400 of the accumulator 144 will move at a relatively high pressure thus allowing a higher pressure build-up in servomotor 50 to increase the torque capacity of clutch 20, as compared to a condition where the line pressure in conduit 420 is lower reflecting low engine torques. Thus the accumulator serves to match the clutch engagement to the torque requirements to enhance a smooth engagement thereof. The rate of pressure build-up after piston 400 begins to move depends on the spring rate of spring 404.

Depending upon the amount of throttle pressure in conduit 440 at port 305 acting on land 296 tending to keep the 1:2 SV 134 in its "1" position, when a predetermined vehicle speed is reached and thereby a predetermined amount of governor pressure in conduit 450 acting on land 292, the 1:2 SV 134 will move to its "2" or upshifted position. Passage 440 is blocked off at this time blocking throttle pressure from port 307 to provide the well known "hysteresis" effect. When the stem 290 goes to its "2" position line pressure at port 300 will be connected between lands 292 and 293 to port 298 and conduits 462 and 464. Pressure in conduit 462 is blocked at port 462 by land 256 since 2:3 SV 128 is in its downshifted or "2" position. Line pressure in conduit 464 will flow through orifice 492 of valve 484 to the servomotor 55 for intermediate brake 24. One of the races for the one-way brake 62 will then be held stationary thereby making one-way brake 62 effective such that sun gear 36 is held and the transmission is conditioned for second speed one-way driving ratio. Accumulator 148 at this time acts to control engagement of the servomotor 55 in a manner similar to the action of accumulator 144 to match the engagement of the brake 24 with the torque requirements of the vehicle. At this time the front clutch 20 remains engaged, engagement of clutch 20 and brake 24 together conditioning the transmission for second speed drive ratio.

As the vehicle speed continues to increase depending upon the amount of throttle pressure in conduit 440 acting on land 254 of 2:3 SV 128, a point will be reached at which the governor pressure acting on land 260 will move stem 252 to its "3" or upshifted position. Once the valve stem 252 is moved to its upshifted position, governor pressure which had been acting on the differential area between lands 258 and 260 is cut off thus requiring a different level of governor pressure before the valve stem 252 can be moved back to its "2" position and providing the "hysteresis" effect. When stem 252 is moved to its "3" position line pressure at port 262 will be admitted between lands 256 and 258 to port 267 and into conduit 454. Pressure in conduit 454 flows through the orifice 492 of ball valve 482 to the small servomotor 70 for the second clutch 21. The engagement of the second clutch 21 will be controlled by accumulator 146 as was the case with accumulators 144 and 148 to match engagement of the servomotor 70 with the torque requirements of the vehicle. Line pressure in conduit 454 also acts on land 363 of the RSCV 142 to insure that the stem 362 is in its position to the right as viewed in FIG. 2A, for reasons to be described later. Only the small servo 70 is utilized at this time to engage clutch 21 since in the direct drive ratio of the transmission clutches 20 and 21 are sharing the torque load and a high pressure or high engaging force is not required, utilization of the small servomotor 70 providing a smoother shift than would be the case if the larger servomotor were utilized.

After the transmission is in its direct drive or third ratio as vehicle speed begins to drop and thus governor pressure in conduit 450 drops, the 2:3 SV 128 will return to its "2" position thus conditioning the transmission again for second speed drive. The engaging pressure for clutch 21 is exhausted from conduit 454 between lands 256, 258 into conduit 434 and thus to port 174 of MV 116 to exhaust port 177. During the time the vehicle was operating in direct drive or high speed ratio, the brake 24 remains engaged since during the high speed ratio when the transmission is operating in direct drive or the one-way brake 62 overruns in that the direction of movement of the shaft 34 when the planetary transmission is locked up is in the overrunning direction, thereby making is unnecessary to release the brake 24 when the transmission is in direct drive ratio.

As stated above, when the 2:3 SV 128 returns to its "2" position the direct drive clutch 21 will be disengaged and the transmission will immediately return to second speed drive ratio since brake 24 conditioning one-way brake 62 for operation has remained in engagement. The transmission will remain in second speed ratio until such time as the governor pressure drops to a point at which the spring 324 acting on land 296 is sufficient to overcome governor pressure. When the valve stem 290 of 1:2 SV 134 returns to its downshifted or "1" position conduit 462 will be connected through port 298 between lands 293, 292 and exhaust port 308 to exhaust pressure in conduit 462. Land 293 will block the pressure in line 428 at port 300. Thus the servomotor 55 for brake 24 will be exhausted through port 308.

As in the case of the "upshifts" when the transmission shifts from third to second ratio, due to selective sizing of orifice 494 in valve 482, control of the exhaust of direct drive clutch pressure in conduit 454 is provided to produce a smooth downshift. Likewise, when the second to first ratio shift is made orifice 494 of valve 484 will control exhaust of pressure in conduit 464 for intermediate brake 24 to provide a smooth downshift.

When the operator places the MV 116 in the "2" position, conduit 428 will continue to receive pressure from conduit 420 and in addition, conduit 436 will receive pressure through port 167, pressure flowing from port 168 of conduit 428 between lands 163, 162 into port 167. Pressure in conduit 436 will flow through port 274 on ICSV 130 and act on the large land 271 of piston 270 urging the piston downwardly as viewed in the drawings. If the vehicle speed is high and consequently governor pressure acting on land 260 of 2:3 SV 128 is high, valve stem 270 will not move down until vehicle speed drops somewhat. This is to provide the inhibited 3:2 shift, that is, if the vehicle is operating in third speed ratio when the "2" position of MV 116 is selected and vehicle speed is too high, the transmission will not immediately shift to second speed which could overspeed the engine. When the vehicle speed drops sufficiently the stem 270 will move down admitting pressure from conduit 436 to port 275 and conduit 456 to port 284 of the ICMV 132. Spring 289 has at this time positioned stem 280 to the right, as viewed in the drawing, and pressure from port 284 will flow between lands 281, 282 to port 283, back into port 285 at the right end of the valve to act on land 282 and to regulate the pressure in line 456 admitted to conduit 458 to a lower value, which, for example, could be 30 psi. This lower pressure will be admitted through port 302 between lands 293, 294 of 1:2 SV 134 to conduit 460 and to servomotor 54 for the intermediate coast brake 23. The pressure is reduced to apply coast brake 23 since a high pressure is not required at this time. The one-way brake 62 is still effective and shares the torque load with the intermediate coast brake 23 such that a high engaging force is not required, and the reduced pressure is helpful to make the 3:2 downshift smooth. The function of the intermediate coast brake being to provide a two-way driving relationship such that engine braking is available when the intermediate coast brake is engaged, as is desired when the operator has selected the "2" or second speed position of the manual valve.

When the operator of the vehicle moves MV 116 to the "1" position, conduits 428 and 436 as explained in connection with the "2" position above, still receive line pressure. In addition, fluid pressure is admitted through port 172 into conduit 430. Pressure in conduit 430 is admitted through port 338 and between lands 332, 333 of LCMV 138 into conduit 432. As explained in connection with ICMV 132, the LCMV 138 functions to reduce the pressure in conduit 430 to a lower value such that the pressure in conduit 432 would be, for example, 30 psi. The pressure in conduit 432, assuming the stem 310 of LCV 136 is in the upper position due to the action of the spring 324, at port 316, and 318, will act on the opposite sides of lands 312. The upper side of land 312 comprising a larger area, there will be a tendency for the stem 310 to move down to admit pressure from port 316 into port 317 and into conduit 466 to engage the low coast brake 25. However, the point at which the stem 310 will move downwardly to engage the low coast brake will also be influenced by the position of the 1:2 SV 134. If 1:2 SV 134 is in its "2" position it will be in contact with the stem 310 and will hold the stem 310 in its upper position preventing engagement of the low coast brake. This is to again provide the inhibited downshift in that first ratio by engagement of the low coast brake will not be obtained unless the vehicle speed and governor pressure is sufficiently low to allow 1:2 SV 134 to be in its "1" position. When the 1:2 SV 134 moves to its "1" position pressure from conduit 432 will be admitted to conduit 466 where it will flow into port 356 of the RSBV 140 and to the servomotor 58 for low coast brake 25.

The stem 350 for RSBV 140 will remain in its downward position as illustrated in the drawings, due to the action of spring 359 and the fact that only 30 psi is acting on the end of land 352 tending to move the stem upwardly. With low coast brake 25 applied, the vehicle is conditioned for low or first speed drive ratio and once again, since the torque load is shared between the brake 25 and the one-way brake 60, a high engaging pressure is not required for the brake 25 and the lower pressure actuating servomotor 58 is sufficient to provide the proper engaging force for brake 25.

The use of the low coast modulator valve 138 is advantageous in that the inhibited downshift point incident with the "1" operation of MV 116 may be varied merely by means of changing the spring in the modulator valve and thereby changing the regulated pressure from the modulator valve to engage the brake mechanism.

A kickdown function is available in the transmission control system. If the throttle pedal of the vehicle is depressed completely or all the way to wide open throttle, stem 180 of TV 118 will move to its upper position sufficiently to open port 196 to port 197 between lands 185 and 186. At this time DRV 120 regulates line pressure in conduit 420 to some lower value, this pressure being admitted to conduit 442. Pressure in conduit 442 will be admitted at port 264 and act on the differential area between lands 258 and 260, assuming that stem 252 is in its upshifted position. Pressure acting on this differential area will tend to move the stem downwardly to its "2" position to obtain second drive ratio in the manner as described in connection with the operation of the transmission in "d" position of the MV 116. Stem 252 will move downwardly until governor pressure is sufficiently low so that the regulated kickdown pressure acting on the differential area in addition to the throttle pressure in conduit 440 acting on the end of land 254, is sufficient to overcome the governor pressure. When the stem 252 is thus moved down, second speed ratio will be obtained with the throttle pedal fully depressed. When the kickdown pressure is relieved by release of the throttle such that stem 180 moves to a postion blocking port 197, the transmission will return to third speed ratio if the vehicle speed and governor pressure in conduit 450 is sufficiently high. Further kickdown operation is available to shift the transmission to first speed ratio since the kickdown pressure in conduit 442 will be admitted to the 3-way ball valve 445 through which it will flow into port 307 and act on the end of stem 290 to move the stem 290 to its lower or "1" position. The point at which the stem 290 moves downwardly will again depend on the vehicle speed of governor pressure acting on the land 292 such that the kickdown will not be available at higher speeds when, if the first ratio was established, would overspeed the engine. The kickdown shift points can be easily varied merely by changing the spring 213 for the DRV 120 since the regulated pressure produced by DRV 120 is effective to provide the kickdown operation and changing of the spring will change the regulated pressure produced.

MV 116 has, in addition, an "R" position. In the "R" position conduit 430 will be connected to line pressure in conduit 420, the port 170 being connected between lands 164 and 165 with port 172. In addition, conduit 434 likewise will be connected to line pressure in conduit 420. Pressure in conduit 434, which is the reverse pressure conduit, will be admitted at PRV 112 to act on PRV 112 to increase the line pressure produced by PRV 112 in a known manner such that sufficient increase in pressure is available to hold the friction elements of the transmission for reverse drive (increased reaction torques being present in reverse ratio). Reverse pressure in conduit 434 will also be admitted at port 320 of LCV 136 and will act on the differential area between lands 313 and 314 to insure that stem 310 is in its upper position. Pressure in conduit 434 will also be admitted at port 261 of 2:3 SV 128 to act on the differential area between lands 254 and 256 tending to move the stem 252 downwardly to insure that the 2:3 SV 128 is in its "2" position prior to reverse condition being obtained.

Pressure in conduit 434 will then be admitted at port 263 between lands 256 and 258 and through port 267 to conduit 454 and thus to engage the direct drive clutch by engagement of servomotor 70 initially. Pressure in conduit 434 will be, in addition, admitted at port 367 of RSCV 142. Initially, stem 362 of RSCV 142 will be to the left as moved by the spring 370, and the pressure in conduit 434 will be blocked at port 367. However, pressure in conduit 454 is admitted at port 366 of RSCV 142 to act on land 363. Since at this time the pressure admitted at 366 is the increased line pressure, the pressure will be sufficient to move the stem 362 to the right to admit pressure from port 367 to port 368 and into conduit 470 to the large servomotor 52 for the second clutch 21. The shift into reverse is thus smoothly carried out since initially the small servomotor 70 is engaged and then later, after the stem 362 for the RSCV 142 moves to the right the large servomotor 52 is actuated. Thus both servomotors 52 and 70 are used to provide the increased engaging pressure required to hold the second clutch 21 in reverse drive. The operation of the RSCV 142, as explained above, insures that the small servomotor 70 will be first engaged.

Reverse drive further requires engagement of brake 25. The pressure in conduit 434 admitted at port 320 of LCV 136 acts on the differential area 313, 314 to move stem 310 upwardly thus admitting pressure from port 320 through port 319 into conduit 466. Increased line pressure is admitted to conduit 466. The pressure in conduit 466 is connected to the servomotor 58 to engage brake 25 to condition the transmission for reverse driving operation.

In "P" position of MV 116, line pressure in conduit 420 is connected only to conduit 430 such that low coast brake 25 is engaged. Since the clutches 20 and 21 are not engaged at this time, no drive ratio is established although brake 25 is engaged. A parking pawl mechanism (not illustrated) is mechanically engaged with element 45 of the gear set to hold the vehicle stationary when MV 116 is moved to "P" position as is well known in the art.

Various of the features of the invention have been particularly shown and described; however, it should be obvious to one skilled in the art that various modifications may be made therein without departing from the scope of the invention.

What is claimed is:

1. A hydraulic control system for an automatic transmission for vehicles, the transmission including an input shaft and an output shaft and the planetary gearing connected between said shafts, a plurality of fluid actuatable engageable devices adapted to produce a plurality of drive ratios by selective engagement thereof one of said devices comprising a first clutch, certain of said drive ratios being established by engagement of said first clutch, one of said drive ratios being a direct drive ratio, another of said engageable devices comprising a second clutch engageable to provide said direct drive ratio, a source of pressure for said control system, means in said control system developing a fluid pressure signal responsive to vehicle speed and engine torque, valve means in said control system interconnected between said source and said engageable devices so as to be actuatable to selectively connect said source to said engageable devices, a hydraulic accumulator provided in each of the connections between said valve means and said first and second clutch devices, said accumulators having a piston, said piston having at least two pressure responsive surfaces thereon, the pressure being supplied to engage said clutch mechanisms being applied to one of said pressure responsive surfaces and said vehicle speed and engine torque signal being applied to said other surface, whereby the torque capacity buildup of said friction devices is delayed by said accumulators and the engagement of each of said clutch mechanisms will be controlled in accordance with vehicle speed and engine torque.

2. A control system as claimed in claim 1 wherein said torque and speed signal producing means comprises a first valve connected to said source of pressure and movable in accordance with the engine throttle opening so as to produce a signal responsive to engine torque, a second valve connected to said source and developing a signal responsive to the speed of the vehicle, said second valve being connected to said first valve whereby the signal produced by said first valve varies with both vehicle speed and engine torque.

3. A control system as claimed in claim 2 wherein said plurality of engageable devices includes a brake mechanism engageable to provide in conjunction with said first clutch one of said drive ratios, an additional accumulator connected between said brake mechanism and said source, said additional accumulator also being connected to said vehicle speed and engine torque signal whereby engagement of said brake mechanism will be controlled in accordance with vehicle speed and engine torque.

4. A hydraulic control system for an automatic transmission for vehicles, the transmission including an input shaft and an output shaft and gearing connected between said shafts, a plurality of fluid actuatable engageable devices producing a plurality of drive ratios through said gearing by selective engagement thereof, at least one of said devices being engageable to establish either a forward or a reverse drive ratio, a pair of hydraulic servomotors associated with said one device, one of said hydraulic servomotors being actuated by said control system for said forward drive ratio and both of said servomotors being actuated by said control system for reverse drive ratio to provide increased engaging force, a source of pressure for said control system, a first valve means in said control system, a fluid connection between said first valve means and said one servomotor, a second valve means between said fluid connection and the other of said servomotors, said first valve means reducing the pressure from said source and supply same to said fluid connection and said one servomotor when said forward ratio is established; said source being connected to said fluid connection exclusive of said first valve means when said reverse ratio is established, said second valve means normally being in a position interrupting the connection between said other servomotor and said fluid connection, said second valve means being actuatable by the pressure in said fluid connection between said source and said other servomotor when reverse ratio is established since the pressure in said connection is not reduced by said first valve means whereby said second valve means will open communication to said other servomotor whereby a smooth shift is provided when reverse ratio is established since initially only said one servomotor will be actuated and subsequently said other servomotor will be actuated by said second valve means.

5. A hydraulic control system as claimed in claim 4 wherein said second valve means includes bias means urging same to said interrupting position.

6. A hydraulic control system as claimed in claim 4 wherein said one device comprises a brake mechanism.

7. A hydraulic control system as claimed in claim 4 including a manual valve mechanism between said source and said first valve means and said fluid connection, said manual valve means connecting said source to said first valve means for said forward drive ratio, and said manual valve mechanism connecting said source to said fluid connection for said reverse drive ratio.

8. A hydraulic control system as claimed in claim 4 wherein a third valve means is connected between said first valve means and said fluid connection, said third valve means being responsive to fluid signals to either connect or disconnect said first valve means to said fluid connection.

9. A hydraulic control system as claimed in claim 8 wherein means are provided to produce a fluid signal responsive to vehicle speed and said vehicle speed signal being operatively connected to said third valve means to control the position thereof.

10. A hydraulic control system as claimed in claim 9 wherein said vehicle speed signal increases with increasing vehicle speed thereby preventing connection of said first valve means to said fluid connection when said vehicle speed exceeds a predetermined minimum.

* * * * *